United States Patent [19]
Habicht

[11] Patent Number: 5,489,182
[45] Date of Patent: Feb. 6, 1996

[54] LIFTING APPARATUS FOR A CONTAINER

[76] Inventor: Helmut Habicht, 15 Royal Park Ter., Hillsdale, N.J. 07642

[21] Appl. No.: 166,313

[22] Filed: Dec. 10, 1993

[51] Int. Cl.⁶ .................................................. B65G 65/23
[52] U.S. Cl. ......................... 414/420; 187/208; 414/422
[58] Field of Search ...................... 414/3, 8, 419,
   414/420, 422, 21, 282; 212/213, 128; 187/207,
   208, 222, 236, 363, 366; 104/94

[56] References Cited

U.S. PATENT DOCUMENTS

| 934,334 | 9/1909 | Myers | 414/420 |
|---|---|---|---|
| 1,986,620 | 1/1935 | Borden et al. | 187/267 |
| 2,266,915 | 12/1941 | Steedman | 187/363 |
| 2,983,390 | 5/1961 | Lang et al. | 104/94 |
| 3,236,192 | 2/1966 | Esquillan | 104/94 |
| 4,316,528 | 2/1982 | Dechantsreiter | 187/222 |
| 4,411,582 | 10/1983 | Nakada | 187/222 |
| 4,597,707 | 7/1986 | Cornacchia | 187/363 |
| 4,797,050 | 1/1989 | Habicht | 414/420 |
| 4,850,382 | 7/1989 | Williams | 414/8 |
| 5,318,154 | 6/1994 | Aellman et al. | 187/8.41 |

FOREIGN PATENT DOCUMENTS

| 2723340 | 12/1978 | Germany | 414/422 |
|---|---|---|---|
| 1008122 | 3/1983 | U.S.S.R. | 414/422 |
| 1495221 | 7/1989 | U.S.S.R. | 414/21 |

Primary Examiner—Michael S. Huppert
Assistant Examiner—Thomas J. Brahan
Attorney, Agent, or Firm—Patrick J. Pinto

[57] ABSTRACT

An apparatus for lifting containers to elevated positions for charging or discharging of a fluent material. The lifting apparatus includes a support member for the container. This support member may include an integral means for inverting the container. The support member is fastened to a carriage member which is movably guided interior of an elongated tubular column member. The carriage member is elevated or lowered by a lifting means which is mounted interior of the column member. The lifting means is connected to the carriage member by a pivoted link member. In the absence of tension on the lifting means, the link member will stop any uncontrolled lowering of the carriage member to a lowermost postion in the column member. The column member is attached to a base member. A second embodiment of the apparatus discloses additional attachment of the second end of the column member to a support structure. This second embodiment may be adapted for pivoting the apparatus about a vertical axis located within the column. The column member may include internal reinforcement means.

31 Claims, 6 Drawing Sheets

LIFTING APPARATUS FOR A CONTAINER

BACKGROUND OF THE INVENTION

1. Field of the Invention

With regard to the classification of art, this invention is believed to be found in the general class entitled "Material or Article Handling", and more particularly to the subclasses pertaining to the lineal vertical movement of a load support. This apparatus also provides for the elevation, as well as the specific positioning of the load support about a vertical axis.

2. Description of the Related Art

The lifting of receptacles such as containers, drums and the like is the subject of my U.S. Pat. No. 5,344,275, issued Sep. 06, 1994 my U.S. Pat. No. 5,205,699, issued Apr. 27, 1993; my U.S. Pat. No. 4,797,050 issued on Jan. 10, 1989; and my U.S. Pat. No. 4,954,037, issued on Sep. 04, 1990. Each of my listed and identified Applications and Patents are soley owned by me.

U.S. Pat. Nos. 4,797,050 and 4,954,037 are directed to and teach the use of a camming trackway to provide the tilting action of the cradle. The degree of the tilting action is dependent on the magnitude of the lift. U.S. Pat. No. 5,205,699 discloses a lifting apparatus which teaches the independent lifting and tilting of drums. Each of my listed patents show the lifting apparatus to be of a mobile type. This mobility is very important in many applications, but places unwanted lifting and loading limitations for other lifting applications.

My U.S. Pat. No. 5,344,275 discloses a lifting apparatus which is of a stationary type. This lifting apparatus, employs the use of a conventional gear reducer or linear actuator. In many applications of a lifting apparatus, these type of drives are objected to due to load carrying ability and/or the leakage of fluids.

Most known commercial apparatus include a hydraulically operated cylinder to provide the lift for the support. These hydraulic cylinders require a hydraulic control system which is also subject to leakage. The space requirements and the leakage potential makes the use of hydraulic cylinders undesireable. Any leakage problems are unwelcome in those industries which manufacture pharmaceuticals and/or food products.

The present invention overcomes the problems associated with the known prior art by using a lifting means which has increased lifting capacity while minimizing the leakage of contaminants into the environment. The present invention also discloses the use of a reinforced column member. In one aspect of the invention, a safety device is an integral part of the reinforcement.

This present invention is particularly suitable for use in conjunction with fluid bed drying systems used in edible product industries. The present invention is adaptable to various lifting heights; load configurtions; and capacities.

SUMMARY OF THE INVENTION

This invention may be summarized with respect to its objects. It is an object of this invention to provide and it does provide a lifting apparatus which is mounted between an upper and lower support structure while incorporating an internally mounted lifting means.

It is another object of this invention to provide and it does provide a lifting apparatus which includes a reinforced column structure.

It is still another object of this invention to provide a lifting apparatus in which a container tilting means includes a powered drive assembly which is mounted interior of a load support.

It is yet another object of this invention to provide and it does provide a lifting apparatus which includes an integral safety device for limiting uncontrolled movement of the load support to a lowermost position due to a malfunction of the lifting means.

In summary, one aspect of a lifting apparatus for discharging a fluent material from a container includes: a) an elongated tubular column member having a determined cross section for carrying a determined loading while being mounted between a lower support and an upper support of a support structure, the elongated tubular column including an elongated aperture selectively positioned through a wall of the elongated tubular column member, the elongated aperture being of a predetermined length for allowing continuous access to a determined interior portion of the elongated tubular column member; b) a pair of guide rail members being mounted to the interior portion of the elongated tubular column member, each of the guide rail members having a determined length which is in parallel alignment with an axis of the elongated aperture; c) a carriage member being moveable within the interior portion of the column member, the carriage member having a plurality of guide roller members selectively mounted thereon, each of the guide roller members cooperating with the elongated guide rails members for guiding the carriage member during any movement within the interior portion; d) a lifting means being mounted within the interior portion of the elongated tubular column member, the lifting means including a drive means, a flexible tension member, and an attaching means, the lifting means for selectively controlling a lifting and lowering of the carriage member, the flexible tension member being removably attached to a connecting end of a link member of the carriage member by the attaching means, a fulcrum of the link member being pivotally mounted to an upper portion of the carriage member, the link member further including a biased engaging end, the fulcrum being between the biased engaging end and the connecting end, the biased engaging end being configured for engaging an adjacent opening of a plurality of openings in a safety bar, the safety bar being located in the interior portion of the column member, the engaging end of the link member and the adjacent opening cooperating for preventing uncontrolled lowering of the carriage member to a lowermost position due to a malfunction of the lifting means; and e) a support member being arrayed for lifting a container, the support member being positioned exterior of the elongated tubular column member, the elongated aperture of the elongated tubular column member for allowing a passageway for a fastening means attaching the support member to the carriage member.

Another aspect of the invention provides a pivoted connection means at the upper end of the column member and the lower end of the column member to allow pivoting of the apparatus about a vertical axis located interior of its column member.

A third aspect of the invention provides an inverting means for selectively inverting the container. This inverting means includes a trunnion, style mounting arrangement of a hopper portion of the support member. This inverting means may be powered by a drive means mounted interior of end portions of arm of the support member.

In addition to the above summary, the following disclosure is detailed to insure adequacy and aid in the understanding of this invention. This disclosure, however, is not intended to cover each new inventive concept no matter how it may be disguised either by variations in form or additions by further improvements. For this reason, there has been chosen specific embodiments of a lifting apparatus for the discharging of a fluent material from a container. The specific embodiments have been chosen for the purpose of illustration and description as shown in the accompanying drawings wherein:

In the following description and in the claims, various details are identified by specific names for convenience. These names are intended to be generic in their application while differentiating between the various details. Corresponding reference characters refer to like members throughout the several figures of the drawings.

The drawing accompanying, and forming a part of this specification disclose details of construction for the sole purpose of explanation. It is understood that structural details may be modified without departing from the concept and principles of the invention. This invention may be incorporated in other structural forms than shown.

DETAILED DESCRIPTION OF THE INVENTION

Figure 1:
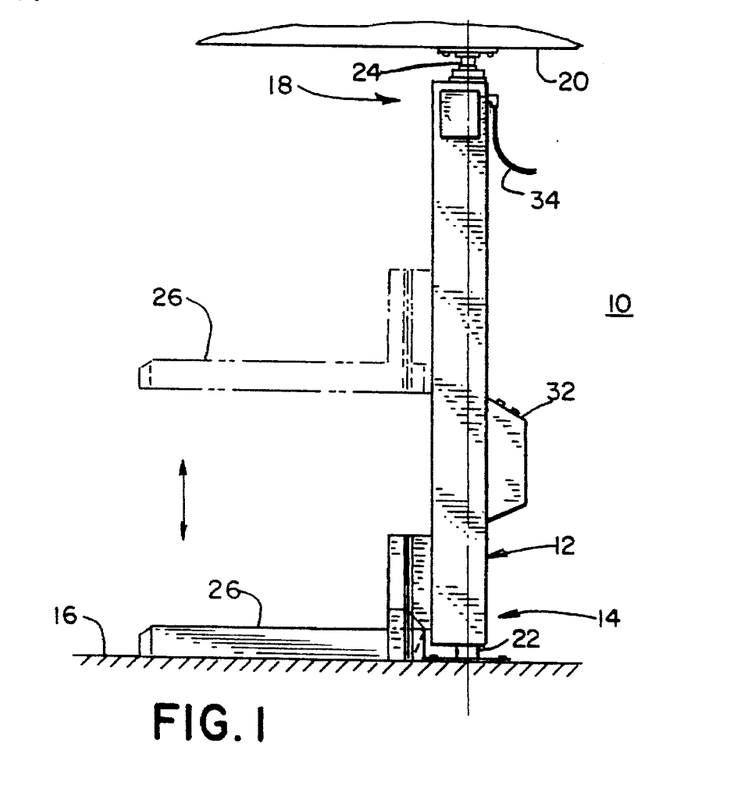
FIG. 1 represents a side elevational view of a lifting apparatus of the present invention.
Figure 2:
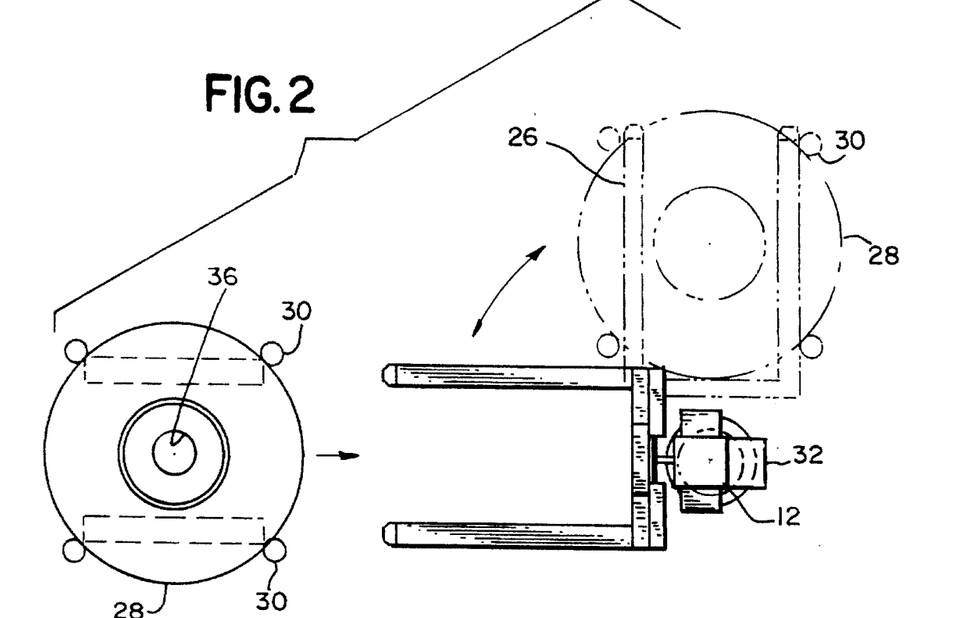
FIG. 2 represents a plan view of the lifting apparatus, this view showing one type of load support.

FIGS. 1 and 2 represent one configuration of a lifting apparatus, which is generally identified as 10. This lifting apparatus 10 includes an elongated column assembly 12. The column assembly 12 is preferably attached at each of its ends to a support structure 10 in a processing facility. For example, the lower end 14 of the column assembly 12 may be fastened to a floor 16. The upper end 18 of the column assembly 12 may be fastened to a beam, ceiling or the like 20. The fastening of the lower end, 14 and the upper end 18 may also include pivoted connections 22 and 24 but not limited thereto. The lifting apparatus 10 includes a support member 26 which is configured as a fork for lifting a container 28. In this first aspect of this invention, the container 28 on dollies 30, is moved onto the support member 26. After the container 28 is positioned fully onto the support member 26, an operator may selectively elevate the container 28 to a preferred height above the lower support 16. In this aspect of the lifting apparatus, the container 28 may be charged or discharged at the discretion of the operator. The lifting apparatus includes an operator control panel 32. This operator control panel 32 may be mounted on the column assembly 12, as shown. Alternatively, the operator control panel may be mounted at a remote operator station, not shown. A source of power 34 is connected to the apparatus 10. A compressed gas such a air is an example of a preferred safe source of power 34 in most cases. Other sources of power may include electric energy or hydraulic power. Pneumatic power is preferred as previously mentioned for its relatively safe operation in hazardous environments, while providing power with minimal contamination to the processing environment.

The container 28 is of the type which is charged by a port 36 at its top end. The container 28 also includes a funnel shaped bottom which has a valved discharging port, not shown. The previously mentioned pivoted mounting of the column assembly would allow the pivotal movement of the container to a second location for charging or discharging, as shown in dashed outline of FIG. 2.

Figure 3:
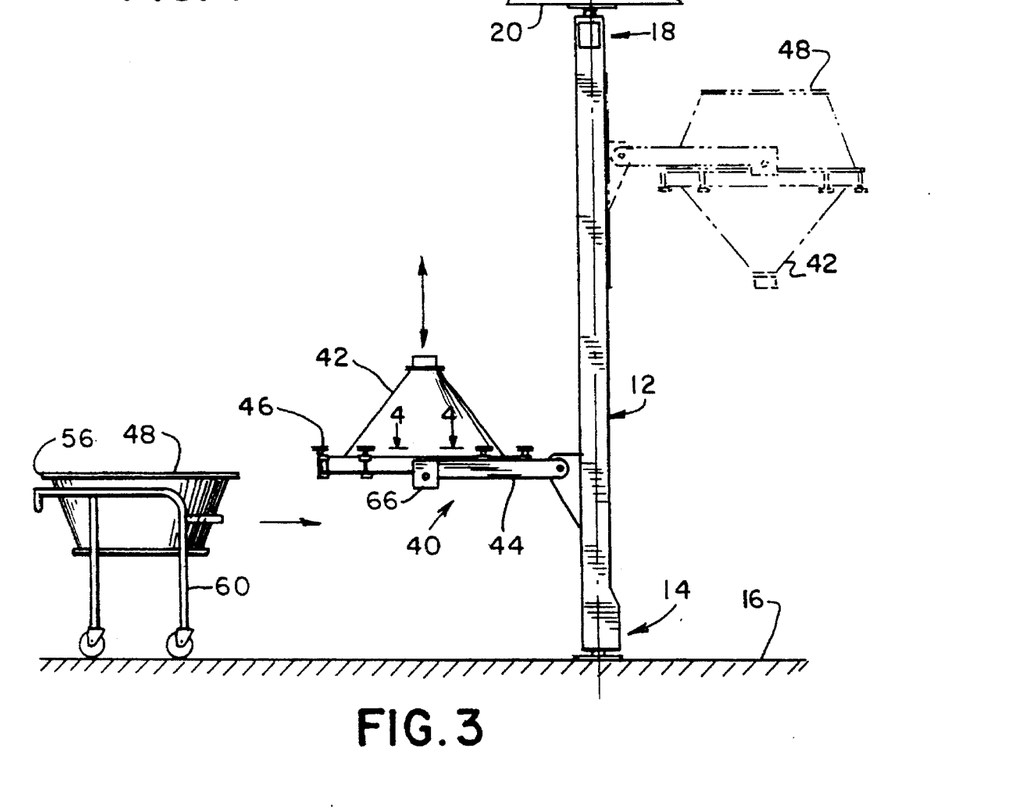
FIG. 3 represents a side elevational view of the lifting apparatus, this view being partly schematic while showing an alternate load support.
Figure 4:
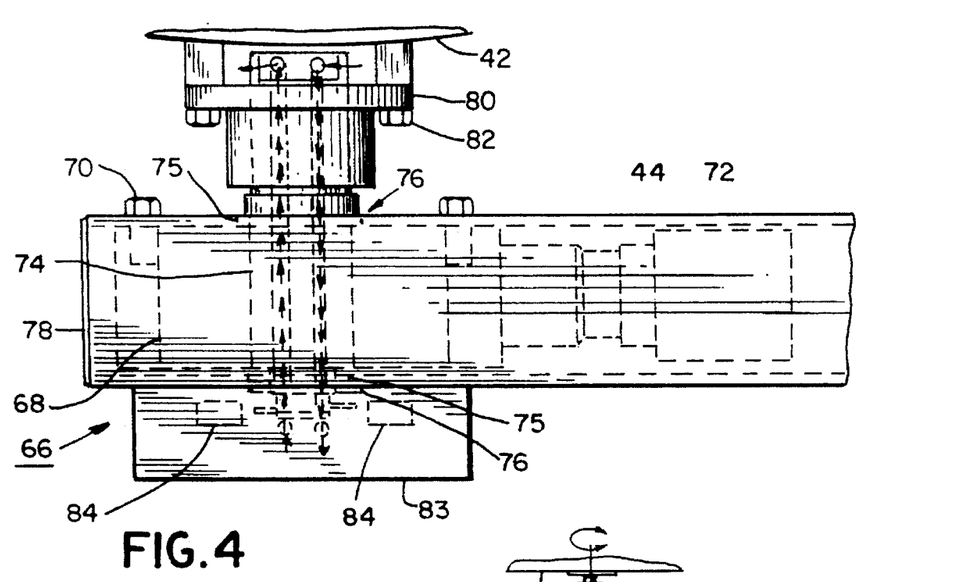
FIG. 4 represents a fragmentary plan view of the load support, this view being taken in the area of and in the direction on line 4—4 of FIG. 3.

A second configuration of the present invention is represented in FIGS. 3; 4 and 5. A second support member 40 is shown as being carried by the column assembly 12. This support member 40 includes a conically-shaped hopper 42, This conically-shaped hopper 42 is mounted in a trunnion fashion to a furcated arm assembly 44. The furcated arm assembly 44 is moveably supported by the column assembly 12 in cantilever fashion. This support member 40 includes a plurality of clamping means 46 for gripping a tub-like container 48. These clamping means 46 securely and removably attach the container 48 to the second support member 40. One type of clamping means, seen more clearly in FIG. 5, includes a threaded hand knob 50; a threaded stud 52; and a lug member 54. The lug member 54 retains a rim 56 of the container 48 by tightening the hand knob 50. The container 48 is released from the support member 40 by reversing the tightening procedure. Other clamping means such as pneumatically, hydraulically or electrically operated toggle clamps may be used for automated operation.

Referring again to FIG. 3, the container 48 may be manually moved into position and in alignment with the support member 40. The manual movement of the container generally utilizes a wheeled cart 60.

After aligning the container 48 with the support member 40, the support member is carefully lowered to contact the rim 56 of the container 48. The container 48, retained by the clamping means 46 of the support means 40, is then lifted off the cart. The discharging end 62 of the support 40 may include a valve means, not shown. This valve means may be of the manual or powered type. A typical valve means is disclosed in my U.S. Pat. No. 5,236,003 issued Aug. 17, 1993. This patent is included by reference to the extent that the law allows.

The trunnion mounting of the hopper 42 allows the container 48 to be inverted. This inversion may be performed manually for relatively small and light loads. The preferred arrangement includes a powered inverting means 66, seen more clearly in FIG. 4. The powered inverting means 66 is mounted interior of the end of the furcated arm assembly 44.

The preferred arrangement for the powered inverting means 66 includes a right angle gear reducer 68. This right angle gear reducer 68 is mounted interior of the end of the furcated arm by means of threaded fasteners 70. For ease of assembly, and to keep the width of the arm to a minimum, it is preferred that the reducer 68 be of the hollow output shaft type. A motor 72 is coupled to the input shaft of the reducer 68. The preferred type of motor 72 is pneumatically operated but electric or hydraulic motors may be used. An output shaft 74 is installed through apertures 75 in the wall of arm 44 and into the bore of the gear reducer 68. The output shaft 74 is retained in the gear reducer 68 by means of a shouldered portion and shaft collars, not shown. It is preferred that secondary seals 76 be installed between the arm 44 and the output shaft 74. The end of the arm includes a gasketed cover plate 78. The cover plate 78 and the secondary seals 76 retain any leakage of fluids within the arm 44. A hub 80, removably attached to one end of the output shaft 74 is also removably attached to the hopper 42 by threaded fasteners 82.

When a powered valve means is used the output shaft 74 and the hub 80 may be configured to provide a conduit for an energy source, such a compressed air. This conduit arrangement may take the path, shown as a dashed arrow in FIG. 4.

Most applications will require only a single powered inverting means 66. Some heavy duty applications may require that a second powered inverting means 66 be installed in the opposite arm of the furcated arm assembly 44. When powered inverting means 66 are used, it is best to motors 72 which are pneumatically operated, since it been found that pneumatically operated motors automatically compensate for any speed differential. An enclosure 83 is provided to house position sensing means 84. These position sensing means 84 provide a position determination and/or terminal points for the inversion of the hopper 42.

Figures 5, 9, 10:
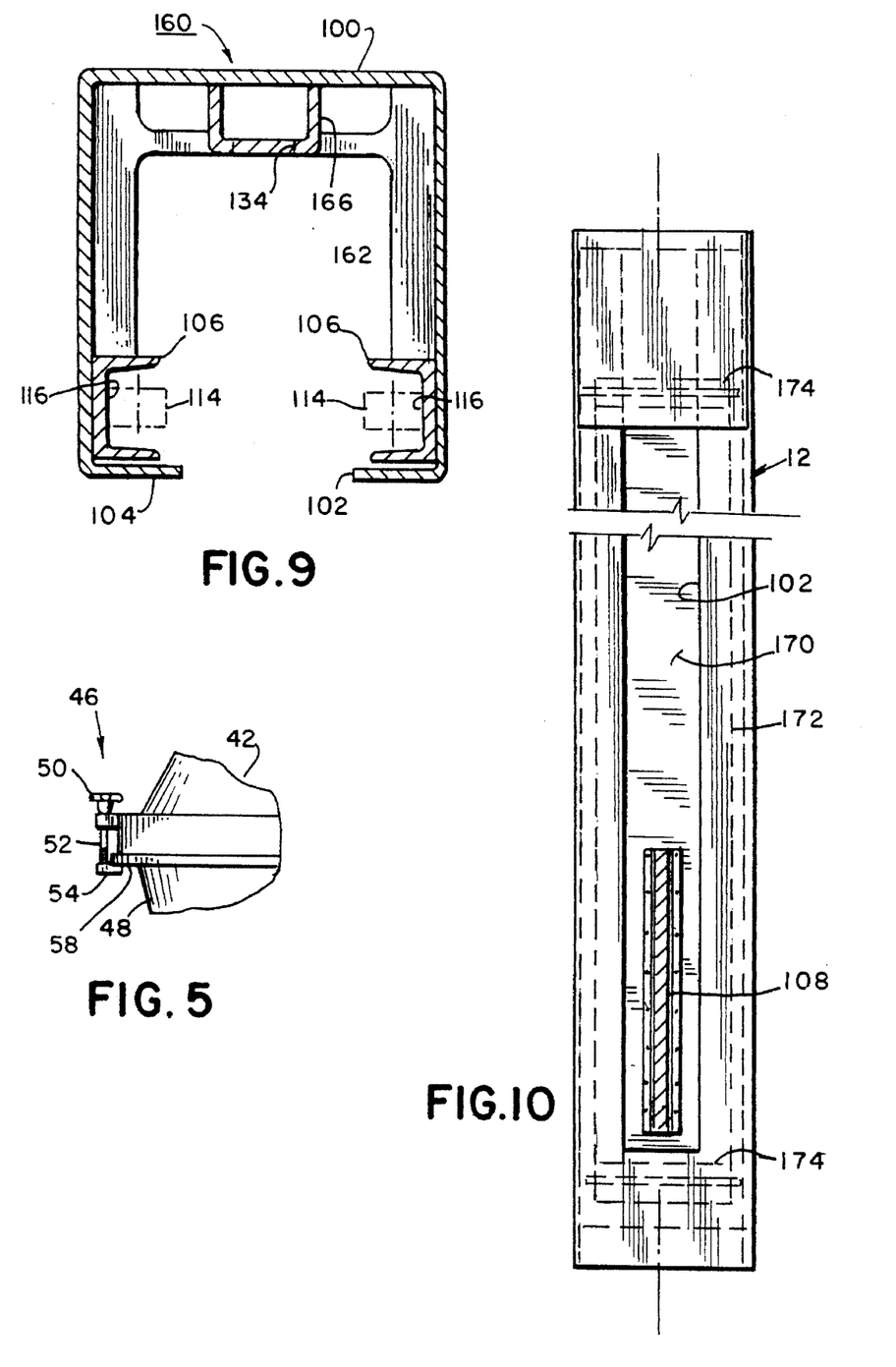
FIG. 5 represents a fragmentary view of a container clamping means of FIG. 3, this view being partly schematic and in an enlarged scale.
FIG. 9 represents a sectional view of an alternate construction for a column, this view being taken in the same direction as FIG. 8.
FIG. 10 represents a fragmentary front elevational view of the column of the present invention, this view showing a covering for an elongated aperture through the wall of the column.
Figure 6:
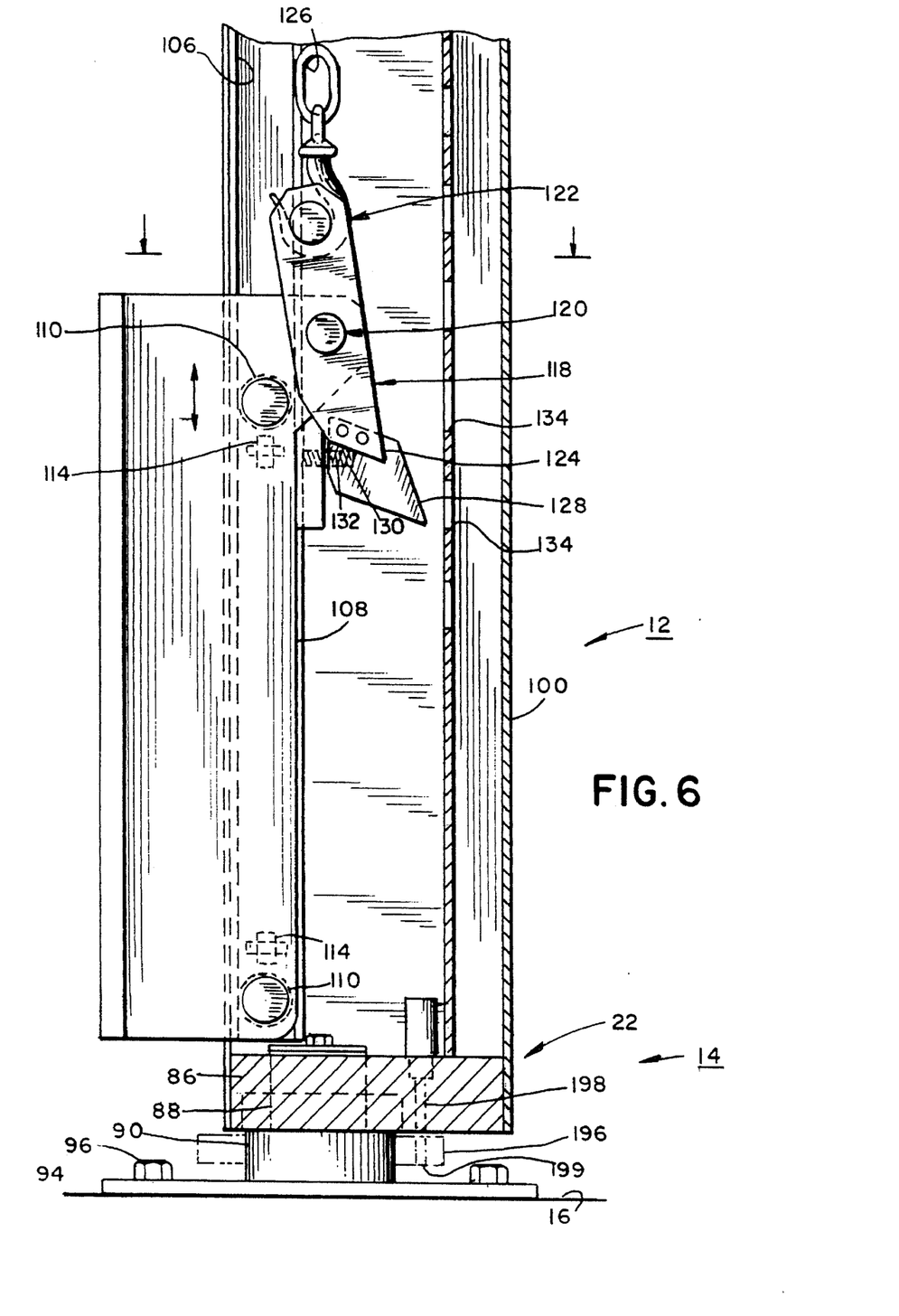
FIG. 6 represents a fragmentary elevational view, in section, of a lower portion of a column of the lifting apparatus.

The construction of the column assembly 12 is shown in greater detail in FIGS. 6 through 10. Referring in particular to FIG. 6, which shows the lower portion 14 of the column assembly 12. This embodiment shows a pivoted connecting means 22, which attaches the column assembly 12 to the lower support 16. The lower end 14 of the column includes a lower bearing block 86 with integral shaft seals for the bottom shaft 88. The bottom shaft 88 preferably includes a shouldered portion 90 for maintaining a determined spacing between the bottom of the column and the lower support 16. The bottom shaft 88 is preferably attached to the lower support 16 by means of a base plate 94 and threaded fasteners 96.

The column assembly 12 includes an elongated column member 100. The elongated column member 100 has a determined cross-section to carry predetermined loads. The cross-section of the column will be discussed later in this description. The column includes an elongated aperture 102 which is selectively positioned in and through a wall 104 of the column member 100. A pair of opposed guide rails 106, having a determined length, are mounted to each side of the elongated aperture 102, as seen more clearly in FIGS. 8 and 9.

Referring again to FIG. 6 and 9, a carriage member 108 is moveably guided interior of the column member 100. This carriage member 108 includes a plurality of guide rollers 110 which are guided by leg members 112 of the guide rails 106. It is preferred that a minimum of four guide rollers 110 be used to provide the desired guidance. Guidance of the carriage member 100 in a second direction is provided by a plurality of guide wheels 114. These guide wheels 114 have their axis of rotation at ninety degrees to the axis of the guide rollers 112. The guide wheels 114 contact the web portion 116 of the guide rails 106, as shown in dashed outline in FIG. 9.

Referring again to FIG. 6, an attaching means 118 is pivotally mounted to an upper portion of the carriage member 100 by way of its fulcrum portion 120. The fulcrum 120 located between a connecting end 122 and a biasing end 124. The connecting end 122 is arrayed for attaching to one end of a flexible tensioning member 126. A preferred type of flexible tension member is a link chain with a hooked end. Other examples of a flexible tensioning member may include a roller chain, wire rope, cable or the like. The biasing end 124 of the attaching means 118 includes a shaped tip member 128. This tip member 128 includes a blind recess 130 for retaining a biasing means 132. A preferred type of biasing means 132 is a compression spring. The opposite end of the biasing means 132 is guided and retained by a recess in the carriage member 100. The tip portion 128 is configured to easily enter a nearby opening 134 of a plurality of openings 134 which are located interior of the column. These openings 134 preferably are spaced at 10 cm. (4 in.) intervals. It can easily be seen that the shaped tip 128 of the biased attaching means 118 will engage a nearest one of the openings 134 when urged by the biasing means 132 in the absence of tension at the connecting end 122. The tip 128 when engaged into the opening 134 limits the uncontrolled lowering of the carriage member 100 to a lowermost position of the column member when a malfunction or fracture in a lifting means 136 or its flexible tension member 126 occurs.

Figure 7:
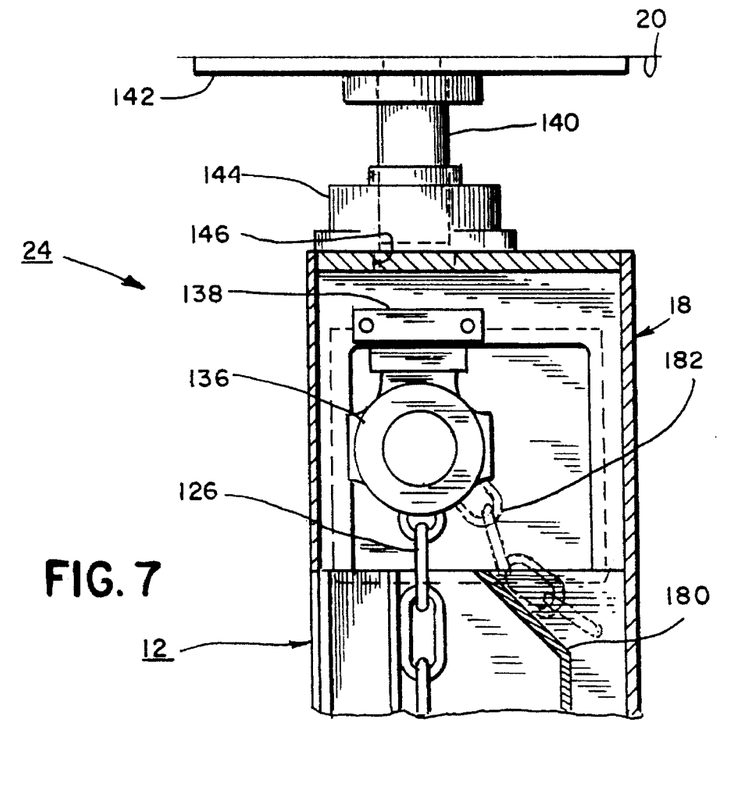
FIG. 7 represents a fragmentary elevational view, in section, of an upper portion of the column of the lifting apparatus.

The lifting means 136 is more clearly shown in FIG. 7. Preferably this lifting means is small in size yet able to handle determined loads in tons. An example of one type of lifting means 136 is an air operated chain hoist. The lifting means 136 is mounted to a mounting bar 138 interior of the upper end 118 of the column assembly 12. For lighter loads, a wire rope hoist may be used as a lifting means 136.

Again referring to FIG. 7, which represents a preferred upper pivoted connecting means 24. An upper shaft member 140 is attached to an upper support 20 by a flange plate 142. The shaft 140 is pivoted in a bearing block 144 which is mounted to the upper end 18 of the column assembly 12. A clearance hole 146 is provided in the upper end 18 of the column assembly 12. This clearance hole 146 allows the shaft 140 to be adjusted with respect to the bearing block 144, facilitating installation and/or accommodating any variations in the specified distances, up to 5 cm. (2 in.), between the upper and lower supports.

Figure 8:
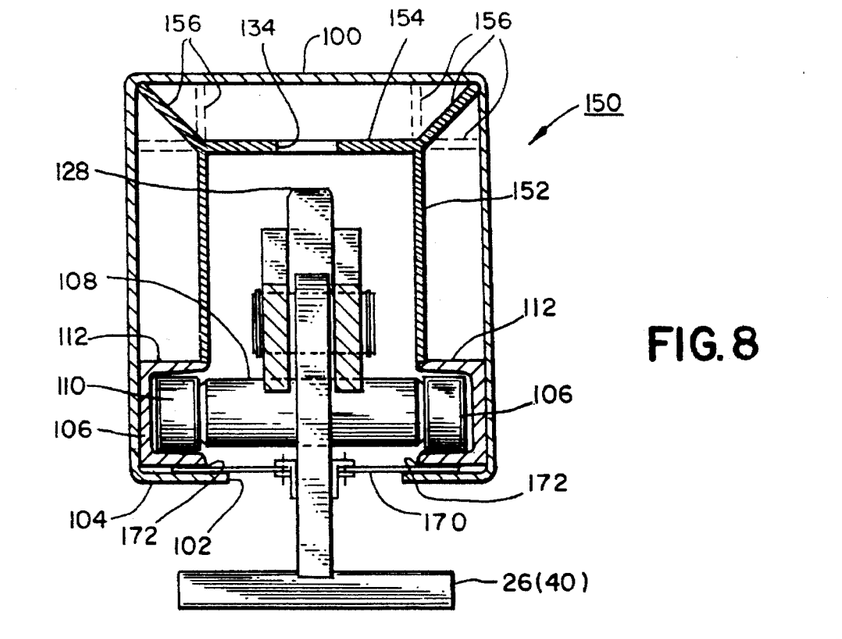
FIG. 8 represents a sectional plan view of the column, this view being taken along line 8—8 of FIG. 6.

FIG. 8 discloses one embodiment of a reinforcing means for or the column assembly 12. This embodiment of FIG. 8 may be characterized as a double wall column member 150. This column member 150 is able to withstand heavy column loading. The column member 150 increased strength minimizes torsional deflection as well as any deflection causing the guide rails 106 to separate. This column member 150 provides for a small envelope with a smooth exterior finish. One example of a small envelope column 150 includes an exterior envelope of 30 cm. by 38 cm. (11.8 in.×15. in.). In this example, the walls of the inner shell 152 are spaced from the walls of the outer column in the vicinity of 5.7 cm. (2.25 in.). The inner shell 152 is firmly attached to the guide rails 106. The rear portion 154 of the inner shell 152 includes tie members 156 which are firmly attached to the interior of the outer column. The preferred arrangement places the tie members 156 so that the corners of the inner shell 152 and its corresponding corner of the outer column are connected. Alternate arrangements for the tie members are shown in dashed outline in FIG. 8. One advantage of the double wall column 150 is that power lines may be run through the spaces between the inner shell and the outer column keeping them out of harms way. Access holes may be provided at spaced intervals along the inner shell, allowing access to the power lines running therein. In the double wall column 150, the plurality of openings 134 are placed in the rear wall 154 of the inner shell 152. The inner shell 152 should extend a major portion of the length of the column to provide the needed reinforcement. This configuration allows lengths as long as 13.7 m. (45 ft.) for a 30 cm.×38 cm. column.

An alternate column reinforcement is shown in FIG. 9. This column 160 has an outer elongated column member 100 and guide rails 106. The column 100 is reinforced with a plurality of rib members 162 which may be characterized as having a horse shoe shape. These rib members 162 are firmly attached to the interior wall of the column 100 at spaced intervals. It has been found that a uniformed spacing up to 47.7 cm. (18 in.) provides the desired reinforcement. At least one channel shaped bar 166 with a plurality of openings 134 is firmly attached to an interior wall of the column 100. Placement of this bar 166 should be such, that engagement by the tip 128 is possible when lifting tension is removed from the attaching means 118. The reinforcing ribs 162 must be firmly attached to the guide rails 106 by welding or the like.

Referring now to FIGS. 8 and 10, some installations of this equipment require that the aperture 102 be enclosed to minimize the escape of any contaminants from within the column assembly 12. To this end a sliding closure means 170 is attached to the carriage member 108. This closure means 170 is guided in tracks 172 adjacent to the elongated aperture 102. It has been found that a food grade belting material provides the needed properties for this application.

Referring now to FIG. 10, the belting is wound onto supply rollers 174. These supply rollers 174 are located at each end of the elongated aperture 102. These supply rollers 74 are preferred to be of a self winding type, such as a negator spring, a slip clutch air motor, or the like. The slip clutch motor preferably is energized simultaneously with the lifting means.

The present invention may incorporate a powered pivoting means which is housed within the lower end 14 of the column assembly 12. This powered pivoting means would include an elongated bottom shaft 88 which is coupled to a powered right angle gear reducer. One example of this arrangement has been disclosed in my pending U.S. Pat. No. 5,344,275.

Referring again to FIG. 7, when a hoist-style lifting means 136 is used, it is preferred that a basket 180 be provided at the upper end 18 of the column assembly 12. The basket 180 may be formed as an integral part of the inner shell 152. When the alternative column 160 is used a basket, similar to basket 180 may be fastened interior of the column assembly 12. The use of a chain basket 180 is recommended to control the path of a slack portion 182 of the flexible tension member 126 away from the path of the carriage member.

Figure 11:
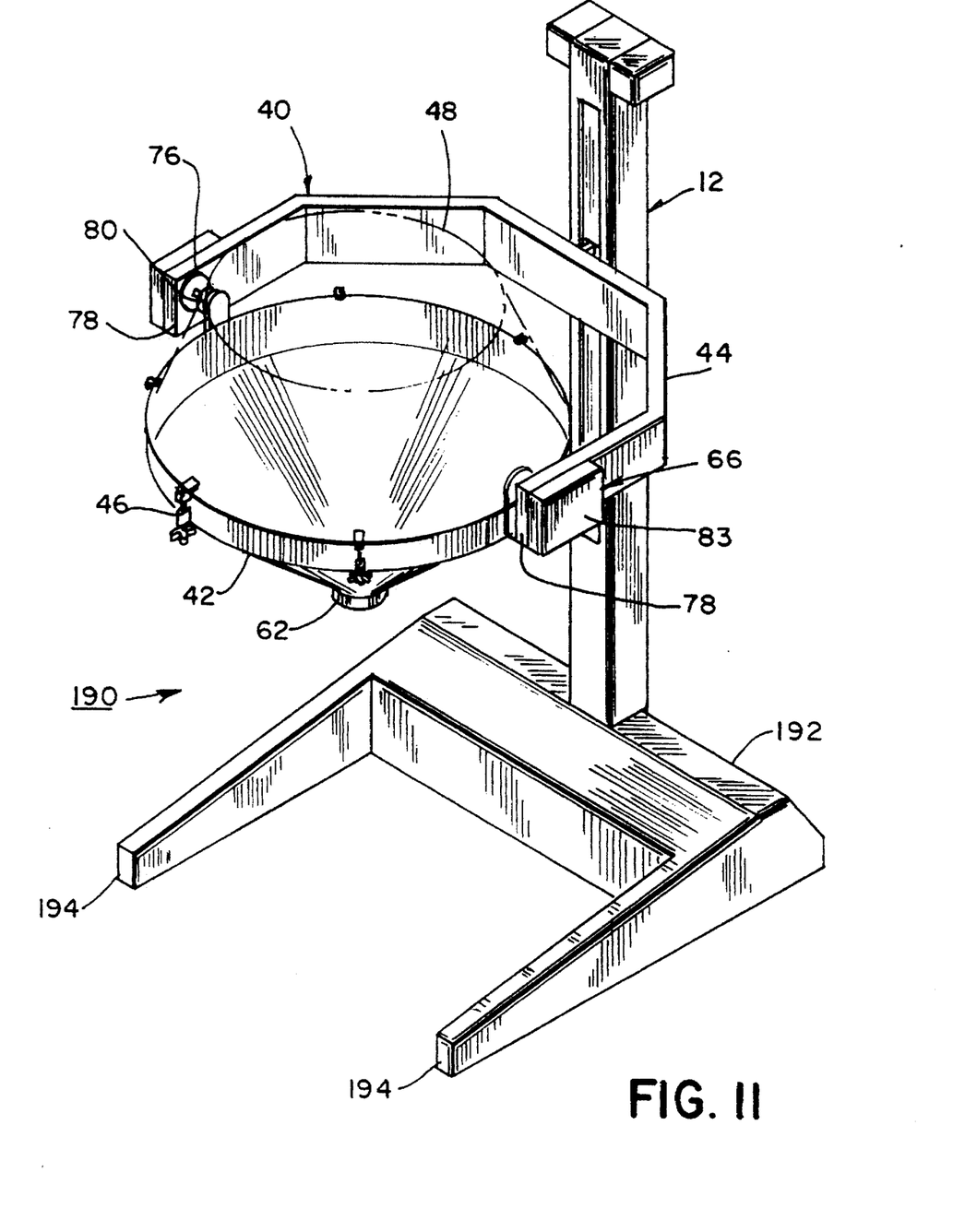
FIG. 11 represents an isometric view of a third configuration of a lifting apparatus of the present invention, this view showing a support member in an inverted position.

Referring now to FIG. 11, which represents a third embodiment of a lifting apparatus. This third embodiment, which is generally identified as 190. In this third embodiment, the column assembly 12 is firmly attached to an enlarged base member 192. This lifting apparatus 190 may be located at a site in a processing plant without attaching the base member 192 to a support or floor. The enlarged base member 192 is generally U-shaped to allow a container 48 carried on its wheeled cart 60 (seen in FIG. 3) to be placed in position under the support member 40. Generally this type lifting apparatus is limited to column lengths of under 3.66 meters (12 ft.) front the floor. This third embodiment 190, as depicted, preferably includes a powered inverting means 66 which has been previously described above, but is not limited thereto.

The front portion 194 of the enlarged, base member 190 should extend a predetermined distance beyond the center of the container 48 to avoid tipping of the apparatus 190. The enlarged base member 192 preferably includes leveling feet to compensate for uneven or pitched floors.

The lifting apparatus of the present invention may include a means for discharging the fluent material by weight. A powered valve means may be controlled by a weighing means to discharge a predetermined quantity of a fluent material.

Referring again to FIG. 6, the pivoted connection means 22 may include a locating means. This locating means is used to positively locate and hold the support member 26 or 40 at a precise location along its arcuate path. The locating means may include a collar 196 and a detent means 198. The collar 196 includes a plurality of locating apertures 199 on a determined bolt circle path. A detent means 198 is mounted to the bearing block 86. This detent means 198 includes a pin member which is biased in an extending direction while being being retracted by pneumatic power, such as by a single acting pneumatic cylinder. The plurality of holes 199 are spaced on the bolt circle to provide the desired positioning of the support member. The pin member automatically enters the locating hole 199 in the vicinity. The pin member may be retracted by pneumatic power when there is a need to change the position of the support member.

The apparatus of the present invention is primarily used in clean environments, therefore the materials used in its construction should be food grade metals. All components should have easily cleaned surfaces with a minimum of pockets for the collection of contaminants. Terms such as "left", "right", "up", down", "bottom", "top", "front", "back", "in", "out", and the like are applicable to the embodiments shown and described in conjunction with the drawings. These terms are merely for the purpose of description and do not necessarily apply to the position in which the lifting apparatus of the present invention may be utilized.

While these particular embodiments of an improved lifting apparatus have been shown and described, it is to be understood that the invention is not limited thereto and protection is sought to the broadest extent the prior art allows.

What is claimed is:

1. A lifting apparatus for a container comprising:

a) an elongated tubular column member having a determined cross section for supporting a determined loading, a lower end of said elongated tubular column being carried by a base member, said elongated tubular column member further including an elongated aperture selectively positioned through a wall of said elongated tubular column member, said elongated aperture being of a predetermined length for allowing continuous access to a determined length of an interior portion of said elongated tubular column, said elongated tubular column member further includes at least one reinforcing means, each of said reinforcing means being simultaneously attached to selected interior portions of said elongated tubular column member and leg portions of a pair of guide rail members;

b) each of said a pair of guide rail members being mounted to said interior portion of said elongated tubular column member, each of said guide rail members having a determined length which is in alignment with an axis of said elongated aperture;

c) a carriage member being moveable within said interior portion of said elongated tubular column, said carriage member having a plurality of guide roller members selectively mounted thereon, each of said guide roller members cooperating with said elongated guide rail members for guiding said carriage member in at least one direction during movement of said carriage member within said interior portion;

d) a lifting means being mounted within said interior portion of an upper end of said elongated tubular column member, said lifting means including a hoist, a flexible tension member, and an attaching means, said lifting means selectively controlling a lifting and lowering of said carriage member, said attaching means for attaching one end of said flexible tension member to a connecting end of a link member of said carriage member, a fulcrum of said link member being pivotally mounted to an upper portion of said carriage member, said link member further including a biased engaging end, said fulcrum being positioned between said engaging end and said connecting end, said biased engaging end being configured for engaging an adjacent opening of a plurality of openings, said plurality of openings being arrayed in parallel alignment with a path of movement of said carriage member, said plurality of openings being interior of said column member, said engaging end of said link member and said adjacent opening cooperating for preventing uncontrolled lowering of said carriage member to a lowermost position in the absence of selective controlling by said lifting means; and e) a support member being arrayed for lifting a container, said support member being positioned exterior of said elongated tubular column member, said elongated aperture of said elongated tubular column member allowing a passageway for a fastening means attaching said support member to said carriage member.

2. A lifting apparatus as recited in claim 1 wherein said support member includes a furcated arm, a conically shaped hopper, and at least one clamping means, wherein said conically shaped hopper is pivotally carried by end portions of said furcated arm for inverting said container being removably attached to said conically shaped hopper by said clamping means.

3. A lifting apparatus as recited in claim 1 wherein said support member further includes at least one powered inverting means, wherein a drive means for each powered inverting means is mounted interior of one of the end portions of said furcated arm.

4. A lifting apparatus as recited in claim 3 wherein said drive means for said powered inverting means includes a pneumatic motor coupled to a hollow shaft gear reducer.

5. A lifting apparatus as recited in claim 4 wherein said powered inverting means includes a sensing means for determining an angular displacement for the powered inversion of said container.

6. A lifting apparatus as recited in claim 1 wherein said reinforcing means includes a plurality of rib members, each of said rib members having a substantially U-shaped configuration and being spaced at predetermined intervals along the length of said elongated tubular column member.

7. A lifting apparatus as recited in claim 1 wherein said reinforcing means includes an elongated inner shell member, said elongated inner shell being substantially channel shaped, said elongated inner shell being fixedly attached to a leg portion of each of said guide rail members while simultaneously having each corner of said elongated inner shell member firmly attached to the interior portion of said elongated tubular column member, said elongated tubular column member and said elongated inner shell member having a predetermined space there between.

8. A lifting apparatus as recited in claim 7 wherein said predetermined space between said elongated inner shell and said elongated tubular column member provides a conduit for the passage of at least one power source therethrough.

9. A lifting apparatus as recited in claim 1 wherein an upper portion of elongated tubular column member includes a basket for containing slack portions of said flexible tension member said basket for controlling the path of the slack portion away from the path of the carriage member.

10. A lifting apparatus as recited in claim 1 wherein said upper end of said elongated tubular column is adapted for attaching to an upper support member of a support structure and said base member of said lower end is adapted for attaching to a lower support member of the support structure.

11. A lifting apparatus as recited in claim 10 wherein said support member includes a furcated arm, a conically shaped hopper, and at least one clamping means, wherein said conically shaped hopper is pivotally carried by end portions of said furcated arm for inverting said container being removably attached to said conically shaped hopper by said clamping means.

12. A lifting apparatus as recited in claim 11 wherein said support member further includes at least one powered inverting means, wherein a drive means for each powered inverting means is mounted interior of one of the end portions of said furcated arm.

13. A lifting apparatus as recited in claim 12 wherein said drive means for said powered inverting means includes a pneumatic motor coupled to a hollow shaft gear reducer.

14. A lifting apparatus as recited in claim 13 wherein said powered inverting means includes a sensing means for determining an angular displacement for the powered inversion of said container.

15. A lifting apparatus as recited in claim 10 wherein said reinforcing means includes a plurality of rib members, each of said rib members having a substantially U-shaped configuration and being spaced at predetermined intervals along the length of said elongated tubular column member.

16. A lifting apparatus as recited in claim 10 wherein said reinforcing means includes an elongated inner shell member, said elongated inner shell being substantially channel shaped, said elongated inner shell, being fixedly attached to a leg portion of each of said guide rail members while simultaneously having each corner of said elongated inner shell member firmly attached to the interior portion of said elongated tubular column member, said elongated tubular column member and said elongated inner shell member having a predetermined space there between.

17. A lifting apparatus as recited in claim 16 wherein said predetermined space between said elongated inner shell and said elongated tubular column member provides a conduit for the passage of at least one power source therethrough.

18. A lifting apparatus as recited in claim 10 wherein an upper portion of said elongated tubular column member includes a basket for containing slack portions of said flexible tension member said basket for controlling the path of the slack portion away from the path of the carriage member.

19. A lifting apparatus as recited in claim 10 wherein said upper end of said elongated tubular column member includes an upper pivoting connection means, said lower end of said elongated tubular column member includes a lower pivoting connection means, said upper pivoting connection means and said lower pivoting connection means allowing said lifting apparatus to pivot about a vertical axis interior of the column member.

20. A lifting apparatus as recited in claim 19 wherein said lower pivoting connection means includes a locating means for selectively holding said lifting apparatus at a determined position about its vertical axis.

21. A lifting apparatus as recited in claim 19 wherein said support member includes a furcated arm, a conically shaped hopper, and at least one clamping means, wherein said conically shaped hopper is pivotally carried by end portions of said furcated arm for inverting said container being removably attached to said conically shaped hopper by said clamping means.

22. A lifting apparatus as recited in claim 21 wherein said support member further includes at least one powered inverting means, wherein a drive means for each powered inverting means is mounted interior of one of the end portions of said furcated arm.

23. A lifting apparatus as recited in claim 22 wherein said drive means for said powered inverting means includes a pneumatic motor coupled to a hollow·shaft gear reducer.

24. A lifting apparatus as recited in claim 23 wherein said powered inverting means includes a sensing means for determining an angular displacement for the powered inversion of said container.

25. A lifting apparatus as recited in claim 19 wherein said reinforcing means includes a plurality of rib members, each of said rib members having a substantially U-shaped configuration and being spaced at predetermined intervals along the length of said elongated tubular column member.

26. A lifting apparatus as recited in claim 19 wherein said reinforcing means includes an elongated inner shell member, said elongated inner shell being substantially channel shaped, said elongated inner shell being fixedly attached to a leg portion of each of said guide rail members while simultaneously having each corner of said elongated inner shell member firmly attached to the interior portion of said elongated tubular column member, said elongated tubular column member and said elongated inner shell member having a predetermined space there between.

27. A lifting apparatus as recited in claim 26 wherein said predetermined space between said elongated inner shell and said elongated tubular column member provides a conduit for the passage of at least one power source therethrough.

28. A lifting apparatus as recited in claim 19 wherein an upper portion of said elongated tubular column member includes a basket for containing slack portions of said flexible tension member said basket for controlling the path of the slack portion away from the path of the carriage member.

29. A lifting apparatus as recited in claim 19 which further includes a sliding closure means for closing said elongated aperture in the wall of said elongated tubular column, said sliding closure means arrayed for preventing contaminants from passing through the elongated aperture.

30. A lifting apparatus as recited in claim 10 which further includes a sliding closure means for closing said elongated aperture in the wall of said elongated tubular column, said sliding closure means arrayed for preventing contaminants from passing through the elongated aperture.

31. A lifting apparatus as recited in claim 1 which further includes a sliding closure means for closing said elongated aperture in the wall of said elongated tubular column, said sliding closure means arrayed for preventing contaminants from passing through the elongated aperture.

* * * * *